(12) United States Patent
Sasaki et al.

(10) Patent No.: US 6,867,879 B1
(45) Date of Patent: *Mar. 15, 2005

(54) PRINTER, CONTROL METHOD OF PRINTER, AND STORAGE MEDIUM FOR STORING CONTROL PROGRAM OF PRINTER

(75) Inventors: Takashi Sasaki, Chigasaki (JP); Hiroshi Kyogoku, Yokohama (JP); Yoshinobu Shiraiwa, Machida (JP); Kenji Takahashi, Tokyo (JP); Shinya Hirai, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,086

(22) Filed: Feb. 9, 1999

(30) Foreign Application Priority Data

| Feb. 16, 1998 | (JP) | ............................................ 10-032843 |
| Feb. 16, 1998 | (JP) | ............................................ 10-032844 |
| Apr. 28, 1998 | (JP) | ............................................ 10-117994 |
| Jun. 10, 1998 | (JP) | ............................................ 10-161893 |

(51) Int. Cl.[7] .............................................. G06F 15/00
(52) U.S. Cl. ........................ 358/1.18; 358/487; 358/506
(58) Field of Search .................. 358/1.6, 1.12, 358/1.13, 1.14, 1.15, 1.16, 1.17, 1.18, 487, 506

(56) References Cited

U.S. PATENT DOCUMENTS

| 4,636,844 A | | 1/1987 | Sasaki |
| 4,682,186 A | | 7/1987 | Sasaki et al. |
| 4,682,216 A | | 7/1987 | Sasaki et al. |
| 4,714,964 A | | 12/1987 | Sasaki |
| 4,731,662 A | | 3/1988 | Udagawa et al. |
| 5,113,267 A | | 5/1992 | Lee |
| 5,337,164 A | * | 8/1994 | Yabe et al. .................. 358/487 |
| 5,502,541 A | | 3/1996 | Olliver |
| 5,682,197 A | | 10/1997 | Moghadam et al. |
| 5,784,149 A | * | 7/1998 | Kawaoka ...................... 355/35 |
| 6,016,184 A | * | 1/2000 | Haneda ....................... 355/36 |

FOREIGN PATENT DOCUMENTS

| JP | 05-7366 | 1/1993 |
| JP | 08-37628 | 2/1996 |
| JP | 08-149487 | 6/1996 |
| JP | 09-93430 | 4/1997 |
| JP | 09-093430 | 4/1997 |
| JP | 09-307802 | 11/1997 |
| JP | 09-322039 | 12/1997 |

* cited by examiner

*Primary Examiner*—Mark Wallerson
(74) *Attorney, Agent, or Firm*—Fitzpatrick, Cella, Harper & Scinto

(57) ABSTRACT

A plurality of image data to print a panorama image is selected from a plurality of image data photographed by a digital camera. The selected plurality of image data is read out and a panorama image composition processing is executed. The panorama image is printed on the basis of the image data which was panorama image composition processed and is printed as a panorama image without transmitting through a personal computer.

27 Claims, 11 Drawing Sheets

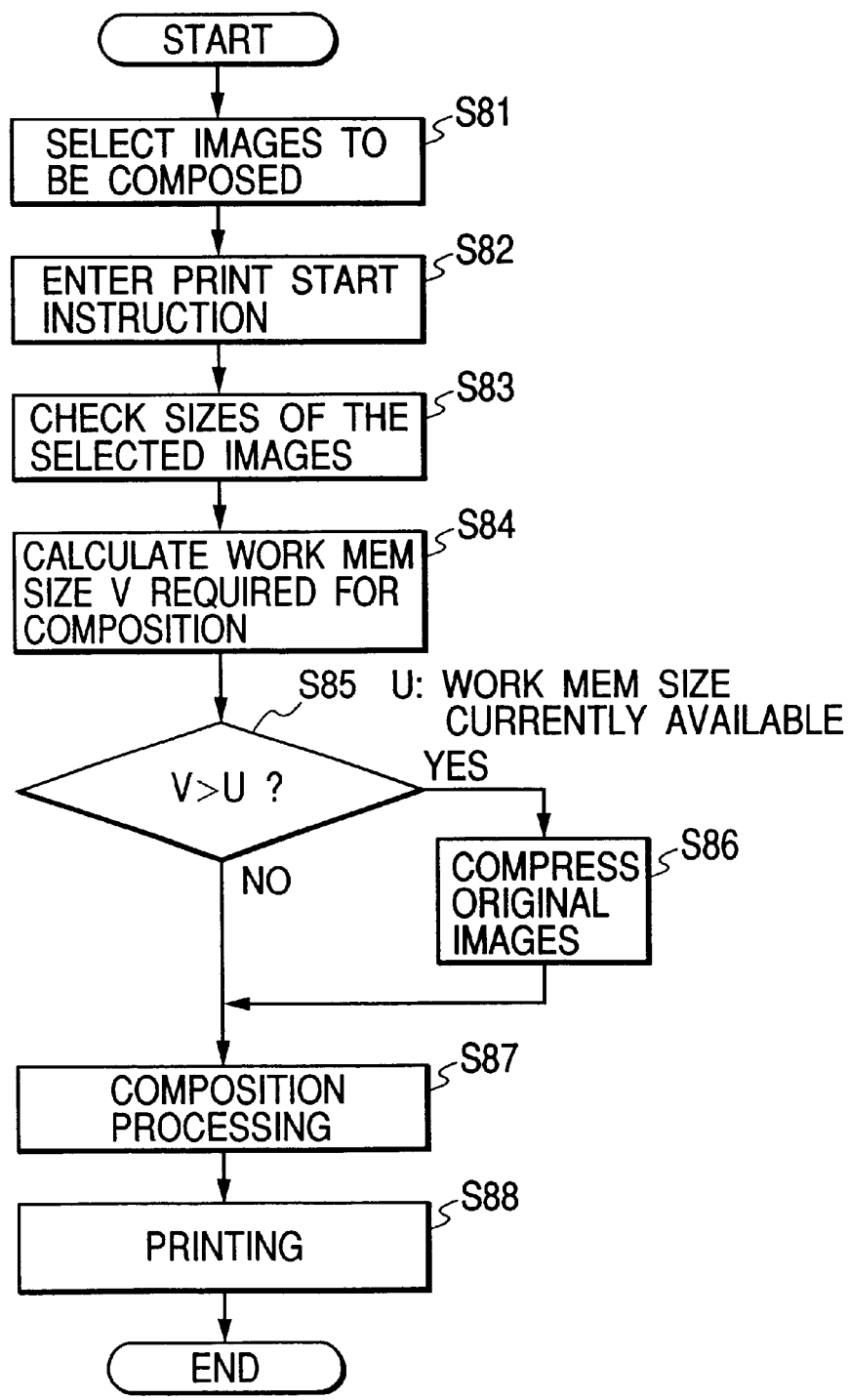

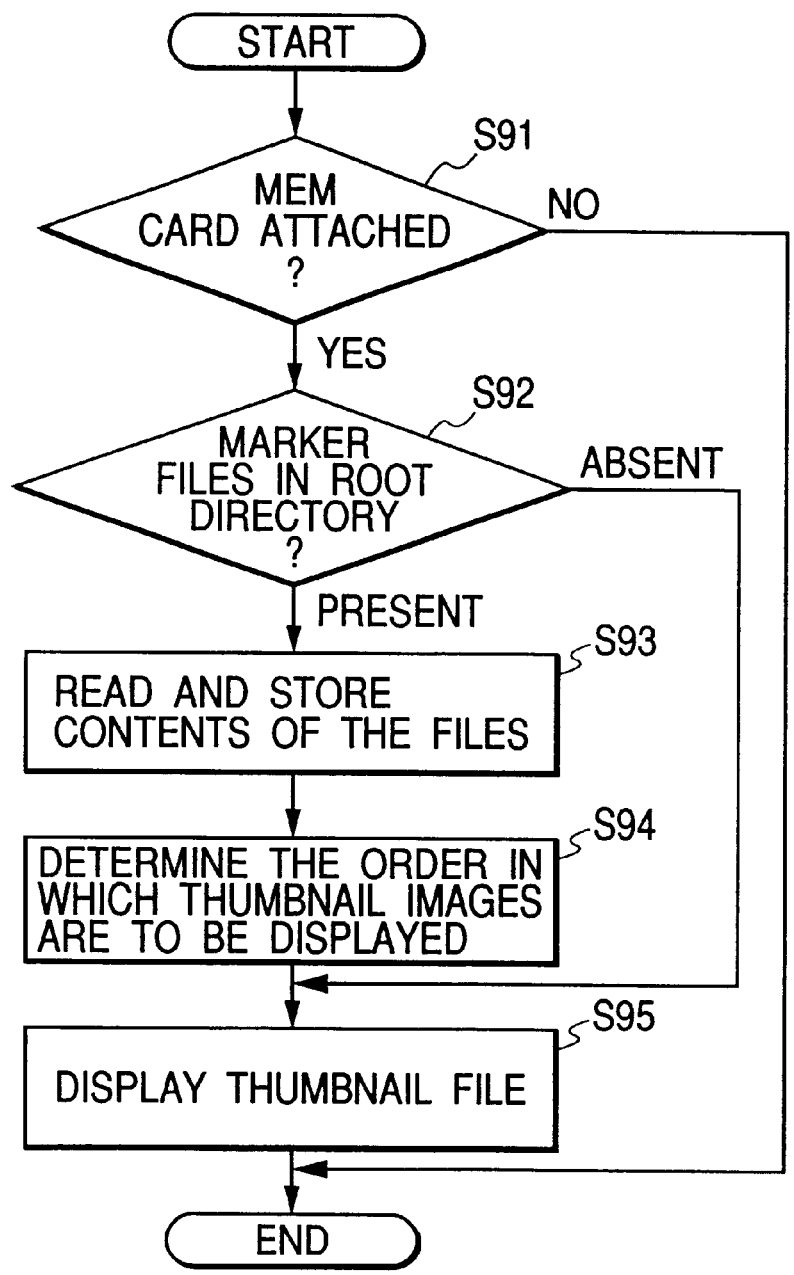

FIG. 10A

| P1-1 0012 | P1-2 0013 | P1-3 0014 | ● 0002 |
| ● 0004 | ● 0021 | ● 0035 | ● 0036 |
| ● 0050 | ● 0108 | 0001 | 0003 |

FIG. 10B

| 0001 | ● 0002 | 0003 | ● 0004 |
| 0005 | 0006 | 0007 | 0008 |
| 0009 | 0010 | 0011 | P1-1 0012 |

FIG. 12

| P1-1 0012 | P1-2 0013 | P1-3 0014 | 0001 |
| ● 0002 | 0003 | ● 0004 | 0005 |
| 0006 | 0007 | 0008 | 0009 |

PRINTER, CONTROL METHOD OF PRINTER, AND STORAGE MEDIUM FOR STORING CONTROL PROGRAM OF PRINTER

BACKGROUND OF THE INVENTION

1. Field of the Invention

The invention relates to a printer, a control method of the printer, and a storage medium for panorama composing an input image from an image input apparatus such as a digital camera or the like and for panorama printing (for example, a width is the same as a standard size and a length is about twice as long as the standard size) the panorama composition image.

The invention also relates to an output apparatus, an output method, and a storage medium for displaying an image.

2. Related Background Art

Generally, an image of a digital camera has been written into a card-shaped storage medium (for example, a CF card or the like) comprising ordinarily a non-volatile semiconductor memory. Therefore, a thermal transfer printer which has slots for those memory cards and prints an input image has recently been proposed. Such a printer is being expected in the form of goods in which there is no need to connect to a personal computer and the user can easily enjoy photographs at home. On the other hand, for example, as disclosed in JP-A-9-93430, a method whereby two or more photographs of a certain scene are photographed by a digital camera so as to have a proper overlap area and are composed to obtain a panorama image has also been proposed. Hitherto, although there has already been proposed a method whereby the above processings are executed by the personal computer and a processed image is transferred to a printer, thereby obtaining a panorama print, there is not yet an example in which such a panorama composition processing is performed by the printer as mentioned above and a panorama image is outputted. If such a printer is realized, it is preferable because a powerful print can be easily formed at home.

However, usually, a plurality of images photographed in order to panorama compose and an image to observe by a single picture mixedly exist in a photographed image of a digital camera. The user needs to instruct the printer by some method to know which images are used to perform the panorama composition processing, so that the printer operation is complicated. Since such a printer operation is ordinarily executed while displaying selection items or instructions onto a monitor connected to the printer in accordance with an OSD (On Screen Display) method, the user feels a troublesomeness such that he has to prepare the monitor.

A memory of a large capacity is necessary for the panorama composition, resulting in a large increase in costs of the printer. For example, a case where a panorama image with an aspect ratio of 1:3 is composed from three images each consisting of 8 bits of RGB of (1024×768) pixels and is printed at a resolution of 300 dpi onto a paper with a size of (100×300) mm is now considered. For this purpose, as a print buffer memory, a memory capacity of (100/25.4×300/25.4×300×300×3)=9.8 MBytes is needed. Further, as a work memory upon panorama composition, a memory capacity of (1536×1024×3×3)=13.5 MBytes is needed.

Although the printer buffer memory is indispensable because it is used for a final print-out, the work memory can be also reduced because it is used to temporarily store intermediate data.

A method, therefore, is considered whereby panorama images are color area-sequentially composed and composed image data is printed, thereby performing a panorama composition in a work area corresponding to one color of a print color. Although the panorama composition processing can be performed by a limited memory by this method, since the same processing is repeated three times, a processing time increases. If the original image size is excessively large or the number of images to be composed is equal to or larger than 3, the memory capacity is also insufficient.

Further, a construction such that a residual capacity of a CF card is used as a work memory for the composition processing is also considered. When the residual capacity of the CF card is small, however, the above construction is not so effective.

Since the number of images which can be displayed on the monitor is small, to confirm the images with marks from a number of image data, there is only a method whereby the images which are sequentially displayed are scrolled and displayed on the monitor and are confirmed. This method takes a time and is very inconvenient.

SUMMARY OF THE INVENTION

It is, accordingly, an object of the invention to provide a printer, a printing method, and a storage medium which can easily print a panorama image without using a personal computer in order to solve the above problems.

Another object of the invention is to provide a printer, a control method of the printer, and a storage medium which can automatically print a panorama image or a standard image in accordance with a state of an apparatus.

Still another object of the invention is to provide a printer and its control method which can perform a panorama composition by a work memory with a smaller capacity.

Further, another object of the invention is to provide a storage medium for storing a software program for embodying the control method of the printer as mentioned above.

Further, another object of the invention is to provide a printer and its control method which can perform a panorama composition or the like of a plurality of images even if a memory capacity that is currently available is limited and to provide a storage medium for storing program software to execute such a method.

Further, another object of the invention is to provide a printer, a control method of the printer, and a storage medium, in which even when there are many images and they cannot be displayed in a lump by display means, images that are specified by marks are preferentially displayed, so that the images specified by the marks can be easily recognized.

Further, another object of the invention is to provide a printer, a control method of the printer, and a storage medium, in which, since images specified by the same mark are collectively displayed, the images specified by various marks can be easily confirmed and a work to print-out can be also easily performed.

To accomplish the above objects, according to the invention, there is provided a printer comprising: selecting means for selecting a plurality of image data to print a panorama image from a plurality of image data; processing means for reading out the plurality of image data selected by the selecting means and performing a panorama image composition processing; and printing means for printing the panorama image on the basis of the image data which was panorama image composition processed by the processing means.

The above and other objects and features of the present invention will become apparent from the following detailed description and the appended claims with reference to the accompanying drawings.

BRIEF DESCRIPTION OF THE DRAWINGS

FIG. 8 is a flowchart for a composition processing of the embodiment;

FIG. 9 is a flowchart showing an example of a processing procedure for embodying the invention;

FIGS. 10A and 10B are diagrams showing examples in the case where images are displayed on a monitor;

FIG. 12 is a diagram showing an example of a display picture plane in case of preferentially displaying images with a panorama composition instruction mark.

DETAILED DESCRIPTION OF THE PREFERRED EMBODIMENTS

Figure 1:
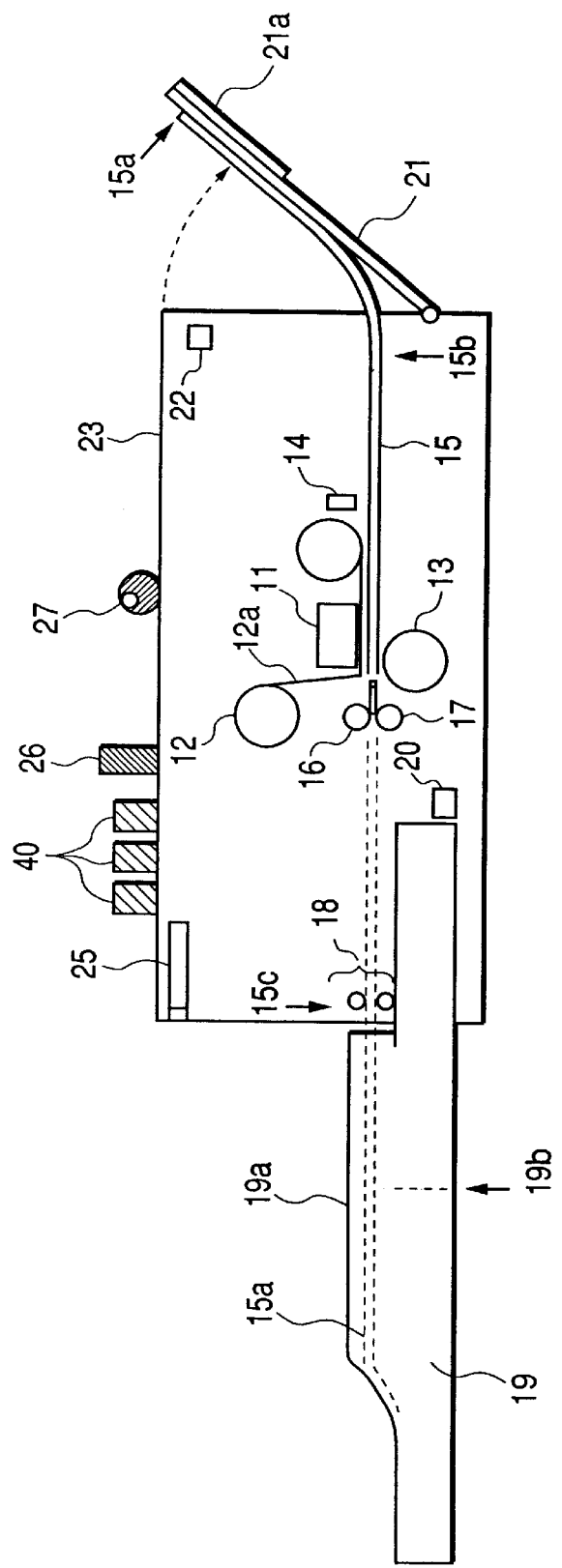
FIG. 1 is an explanatory diagram showing a schematic construction of a sublimation-type printer according to the invention.

An embodiment of the invention will now be described hereinbelow with reference to the drawings. FIG. 1 is an explanatory diagram showing an outline of a construction of a sublimation-type image recording apparatus according to the invention when it is seen from the side. Reference numeral 11 denotes a thermal head obtained by arranging a number of recording electrodes in correspondence to a recording density; 12 an ink cassette in which ink sheets sequentially arranged in accordance with the order of yellow, magenta, and cyan are enclosed in a wound shape; and 13 a platen portion which has a surface of high smoothness and sandwiches an image receiving paper and an ink sheet by a thermal head so as to be movable. The printer has a standard mode to print an image onto a paper of a standard size and a panorama mode to print an image onto a paper of a panorama size (a length in the landscape direction is twice as long as that of the standard paper). In the panorama mode, since a conveyance amount is twice as large as that in the standard mode, as an ink cassette 12, two kinds of ink cassettes for the panorama mode and the standard mode are prepared and can be discriminated by an ink sensor 14 to discriminate the kind of identification mark formed on the ink cassette 12. An image receiving paper 15 is conveyed by a capstan roller 17 through a pinch roller 16. As mentioned above, the paper is conveyed by a distance of a double length in the panorama mode. A motor as a driving source, a transfer gear, and the like are omitted in the diagram. As an image receiving paper, two kinds of papers for the panorama mode and the standard mode are also prepared and each kind of paper is discriminated by a paper sensor 20 to read an identification mark of a paper cassette 19. A protective cover portion 19a of the image receiving paper is arranged in the upper portion of each paper cassette 19 so as to be protruded to the outside of a casing upon panorama recording. In case of the image receiving paper for panorama, a solid line portion 15 exists at a recording start position and a broken line portion 15a exists at a recording end position. After completion of the recording, the paper is ejected to the outside from a casing 23 by a pair of paper ejection rollers 18. Reference numerals 15b and 15c denote a front edge position and a rear edge position of the image receiving paper in case of the standard paper. In case of the standard paper, the paper is enclosed in the casing 23 at the time of the 3-color area-sequential reciprocating recording and is not protruded to the outside. Reference numeral 19b denotes a rear edge position of the paper cassette in case of the standard paper; 21 a tray to support a portion which protrudes to the rear side of the casing upon recording to the panorama image receiving paper and 21a indicates a pull-out extending portion. The pull-out extending portion is usually enclosed in the casing portion and, upon panorama recording, it is pulled out and is used. A slot 25 to insert a media in which image pickup data of a digital camera has been recorded, a switch 26 to instruct the start of printing, keys 40 to perform various operations, and a display lamp 27 to display a warning or the like are prepared at proper positions of the casing, respectively.

Figure 2:
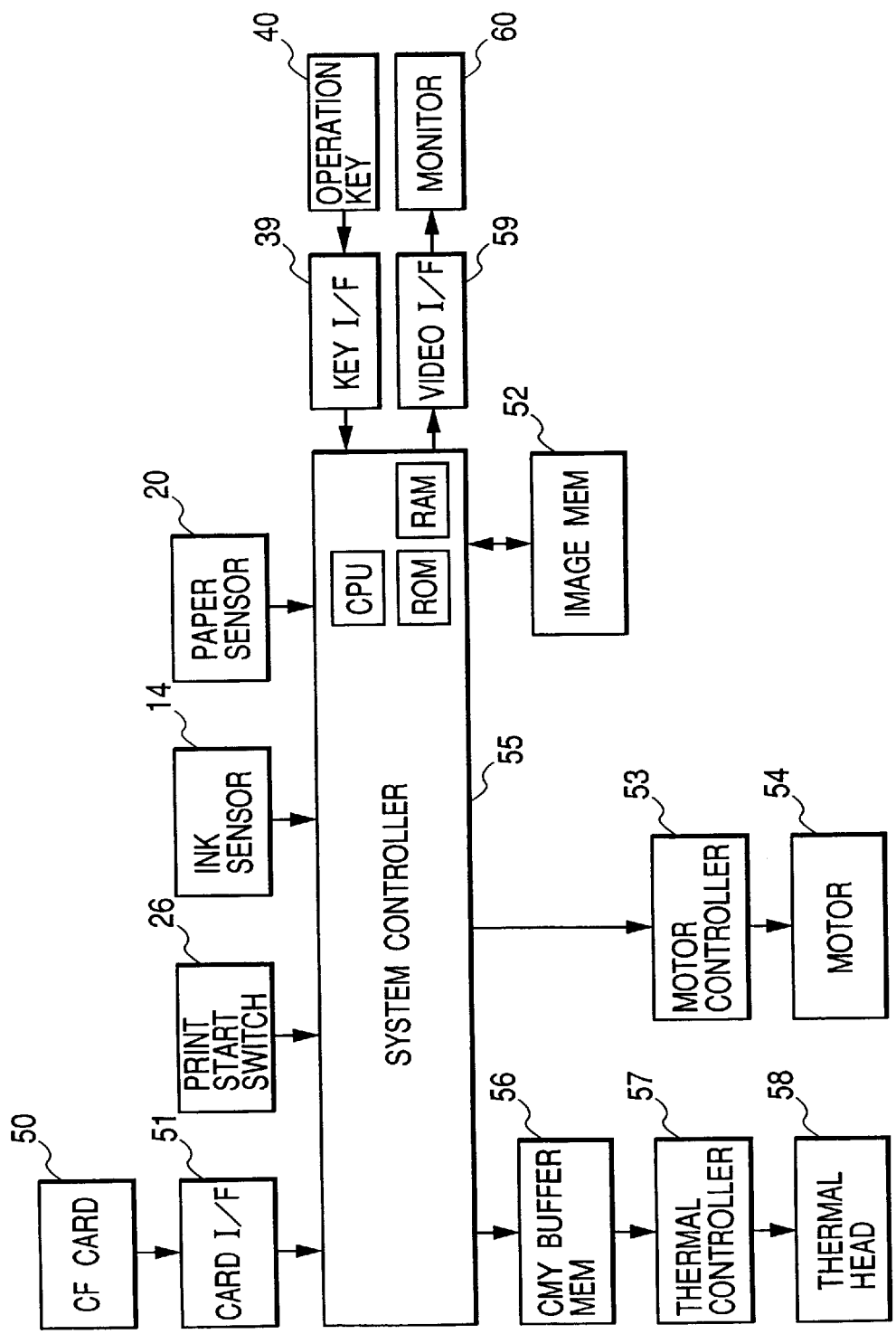
FIG. 2 is a block diagram showing a schematic construction of a controller of the sublimation-type printer according to the invention.

FIG. 2 is a block diagram showing a construction of a control system of a sublimation-type image recording apparatus according to the invention. When the user inserts, for example, a CF card into the slot 25 and presses the print start switch 26, a print start signal is inputted through an operation key interface 39. A system controller 55 discriminates the kinds of set ink cassette 12 and set image receiving paper cassette 19 by the ink sensor 14 and paper sensor 20 and executes either the panorama printing operation or the standard printing operation in accordance with a discrimination result. For example, in case of the ink cassette and image receiving paper for panorama, the panorama mode is selected and a sequence in the panorama mode, which will be explained hereinafter, is executed and a panorama image is composed. A resultant image is transferred to a buffer memory 56. Subsequently, the system controller 55 comprising a CPU, an ROM, an RAM, and the like reciprocates the image receiving paper three times between the thermal head and the ink sheet of the corresponding color every color of yellow, magenta, and cyan according to the composite image data, thereby recording an image. The above operation is executed by supplying a driving pulse to an ink cassette and image receiving paper conveying motor 54 and controlling conveyance amounts of the ink cassette and image receiving paper by a motor controller 53. However, since the landscape width of the panorama size is twice as large as the standard size, the conveyance amounts of ink and paper in the panorama mode are twice as large as those in the standard size mode. At the same time, in a thermal controller 57, the number of strobe pulses is controlled so as to allow the thermal head to generate a desired amount of heat and a coloring density of each color on the image receiving paper is controlled. According to such a construction, by merely pressing the automatic print start switch 26, the user can obtain a desired print irrespective of the panorama size or standard size and does not feel troublesomeness. The apparatus also has a video interface 59 to connect an external video monitor 60.

Figure 3:
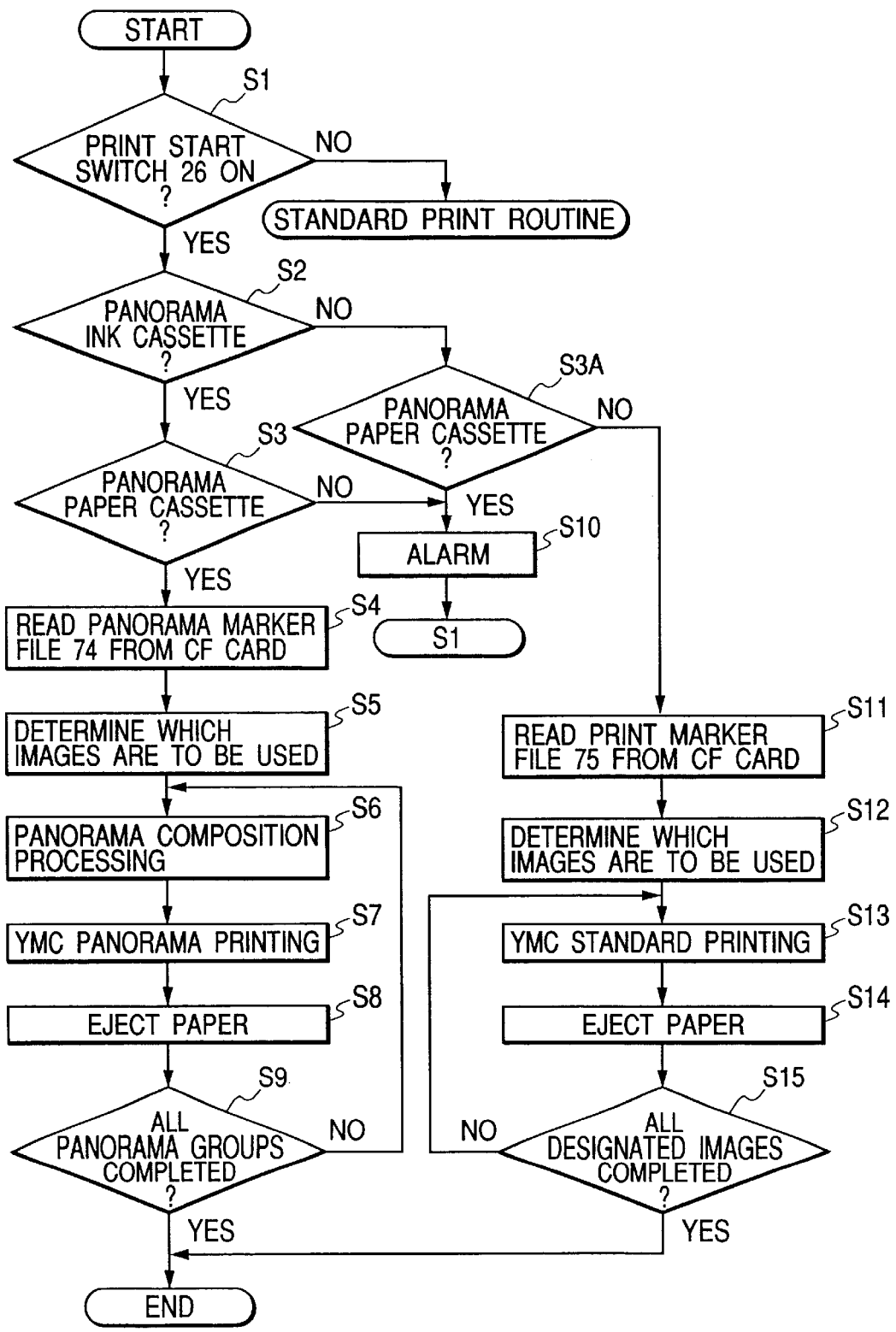
FIG. 3 is a flowchart showing a print processing of a panorama size according to the invention.

FIG. 3 shows a flowchart for the recording processing in the panorama mode. A program according to the flowchart has been stored in the ROM of the system controller 55 and the program is executed by the CPU of the system controller 55.

First in step S1, when it is confirmed that the automatic print switch 26 has been pressed, outputs of the ink sensor 14 and paper sensor 20 are checked in steps S2 and S3. If YES in both steps S2 and S3, a panorama composition processing in step S4 and subsequent steps is executed.

When it is determined to be YES in step S2 and is decided to be NO in step S3 or when it is determined to be NO in step S2 and is decided to be YES in step S3A, the display lamp 27 is flickered, thereby warning the user of a fact that the kinds of ink cassette and paper are mismatched. The processing routine is returned to step S1.

Figure 4:
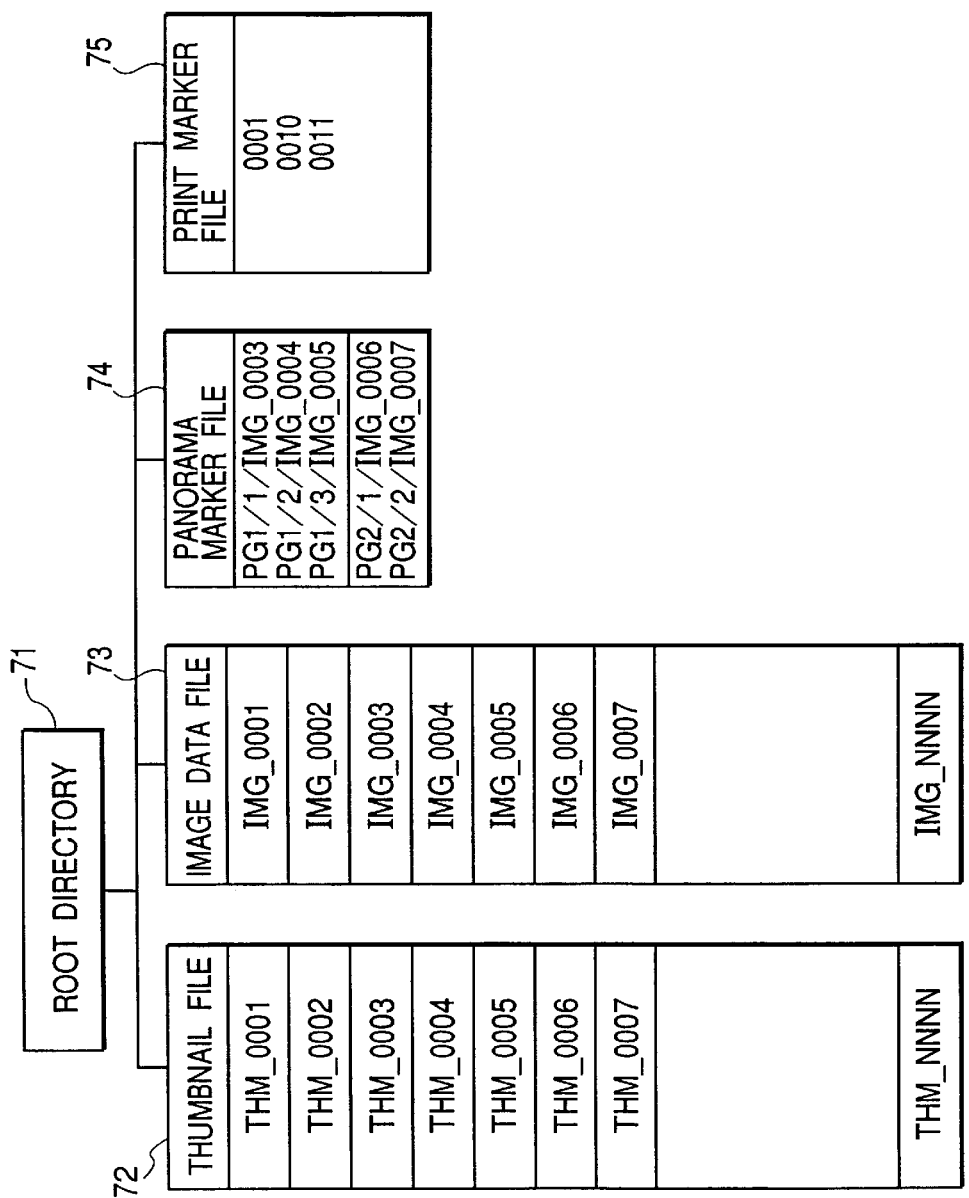
FIG. 4 is a schematic diagram of a file construction of a memory medium of a digital camera.

When the automatic print switch is not pressed in step S1, an ordinary print processing is executed. In step S4, a panorama marker file 74 in the CF card inserted into the slot 25 is read. Information showing which images in the image data have been photographed for the purpose of the panorama composition has been stored in the panorama marker file 74. For example, as shown in FIG. 4, it is now assumed that images 1, 10, and 11 denote images in which the printing has been designated, images 2, 8, 9, 12, 13, etc. are images in which the printing is not particularly designated, images 3, 4, and 5 are a series of image groups for panorama composition, and images 6 and 7 are another series of image groups for panorama composition. In the panorama marker file 74, PG1/1/IMG_0003 denotes an image such that the image 3 should appear at the first position from the left side of a first panorama group (PG1); PG1/2/IMG_0004 shows an image such that the image 4 should appear at the second position (in this case, the center) from the left side of the first panorama group (PG1); and PG1/3/IMG_0005 indicates an image such that the image 5 should appear at the third position from the left side of the first panorama group (PG1). The same shall also similarly apply to the images 6 and 7 of a panorama group (PG2). Such additional information can be simultaneously formed at the time of photographing by the digital camera or can be also additionally recorded and formed later by a personal computer. In step S5, the read information is analyzed, the use of the images 3, 4, and 5 as a first panorama composition processing is decided, and the use of the images 6 and 7 as a second panorama composition processing is determined. In step S6, the images decided in step S5 are read out from the CF card and are temporarily stored into an image memory 52. Ordinarily, the image recorded in the card has been compressed in a form of JPEG or the like, in this case, a proper decompression processing is executed and a stored result is recorded. A panorama composition processing is executed to the recorded image data by using a well-known algorithm as disclosed in, for example, JP-A-9-93430. As an algorithm, although any one of the well-known algorithms can be used, it is particularly desirable to use an algorithm including a processing such that a joint portion of a composite image in the image composition is made inconspicuous. In the embodiment of the invention, the order (for example, arranging order of each of the photographed original images when they are counted from the left side thereof) of the panorama composite picture plane has been inserted in the panorama marker file 74. However, in case of a panorama composition algorithm which can automatically discriminate the order, it can be also omitted. The panorama image which has once been composed in a well-known RGB form is converted into print density data of yellow, magenta, and cyan by a color conversion processing and is recorded into the buffer memory 56. Now, assuming that, for example, the panorama paper size is equal to (100 mm×300 mm) and a density in each of the main scanning direction and the sub-scanning direction of the thermal head is equal to 300 dpi, the image size here is equal to 8 bits for each of RGB of (1181×3543) pixels, namely, (1181×3543×3=11.9 Mbytes. If it is necessary to save the memory capacity, it is also possible to have the buffer memory for only one color and execute the arithmetic operation in step S6 every time for each color and process every color. In step S7, the density data is converted into the number and voltages of strobe pulses of the head to be realized on the image receiving paper and the thermal head is driven while conveying the ink cassette and the image receiving paper on the basis of them. As mentioned above, the motor control to set the conveyance amount to the value that is twice as large as that in the standard mode is performed in the panorama mode. After the data of one color was recorded, the paper is moved back and the image of the next color is again recorded from the head. The above operation is repeated three times with respect to yellow, magenta, and cyan. After completion of the area-sequential panorama recording, the image receiving paper is ejected in step S8 and the recording of the panorama group 1 is finished. In step S9, a check is made to see if the print processing of all of the panorama groups has been finished or not with reference to the number of panorama groups determined in step S5. If YES, the processing routine is finished. If NO, the processing routine is returned to step S6 and the processings in steps S6 to S8 are executed to the next panorama group.

When it is determined to be NO in step S3A, the standard mode to print an image onto a paper of the standard size is selected. In step S11, a print marker file 75 in the CF card inserted in the slot 25 is read. Information showing which images in the image data have been print designated by the user has been stored in the print marker file 75. For example, as shown in FIG. 4, the images 1, 10, and 11 are the images in which the printing has been designated. Such print marker information can be simultaneously formed upon photographing by the digital camera or can be also additionally recorded and formed by a personal computer later. In step S12, the read information is analyzed and the designated images are read out from the CF card and are temporarily stored into the image memory 52. Usually, since the image recorded in the card has been compressed in a form of JPEG or the like, in this case, a proper decompression processing is executed and a stored result is recorded. The panorama image which has temporarily been composed in the RGB form is converted into print density data of yellow, magenta, and cyan by the color conversion processing and is recorded into the buffer memory 56. In step S13, the density data is converted into the number of strobe pulses and voltage of the head to be realized on the image receiving paper and the thermal head is driven while conveying the ink cassette and the image receiving paper on the basis of them. As mentioned above, since the operating mode is the standard mode, the motor control to set the standard conveyance amount is performed in the standard mode. After the data of one color was recorded, the paper is moved back and the image of the next color is again recorded from the head. The above operation is repeated three times with respect to yellow, magenta, and cyan. After completion of the standard print recording, the image receiving paper is ejected in step S14 and the recording of the image is finished. In step S15, a check is made to see if the print processing of the image designated by the print marker determined in step S12 has been finished or not. If YES, the processing routine is finished. If NO, the processing routine is returned to step S13 and the processings in steps S13 and S14 are executed to the next image.

In the above description, although the sublimation-type printer has been considered as a printer, the invention can be also applied to a printer of anyone of the thermal-transfer-type, ink-jet-type, and electrophotographic-type.

Although the automatic selection type by the ink cassette or paper cassette has been described as selecting means of the panorama/non-panorama mode, a mode change-over switch can be also provided for the printer main body. Particularly, in case of the ink jet printer or the like, since the ink cassette does not depend on the recording size, it is desirable to embody the invention by those methods.

Although the present printer has been described with respect to the case of reading the CF card, another card such as a PCMCIA card or the like can be also used or two kinds of slots can be also prepared so as to enable both of the CF card and the PCMCIA card to be read out.

The present printer is characterized in that it is connected to the monitor or the like and a panorama image can be printed without controlling the operation of the printer by the OSD. However, the feature of the invention in which the panorama composite image can be printed by using one button is effective even in the case where in order to meet needs of an image confirmation or the like, a video output is provided to thereby enable the image confirmation and the OSD to be performed although the costs slightly rise.

As described above, according to the printer by the embodiment of the invention, it is unnecessary to connect to the personal computer and to perform the printing operation while looking at the picture plane by connecting to the monitor, thus panorama composite print can be obtained by a simple operation. Even in the case of constructing the printer in a form such that it can be connected to the monitor, a desired print can be derived in any one of the panorama and standard sizes by using one button and the troublesomeness to the user can be remarkably reduced.

According to the embodiment as described above, a panorama image can be easily printed without transmitting through the personal computer.

A panorama image and a standard image can be automatically printed in accordance with a state of the apparatus.

An example of area-sequentially panorama printing will now be described. In FIG. 2, when the ink cassette for panorama and the recording papers have been set, the system controller 55 selects the panorama mode and selects a few original images to be panorama composed by a proper method. As a method of selecting the original images, it is also possible to use a method whereby thumbnail images of the images read out from a CF card 50 are supplied to the monitor 60 through the video interface 59 and are displayed thereon and the user selects proper images by the operation key 40. By adhering proper markers to the original images, the original images can be also automatically selected.

The system controller 55 reads out the image data of the selected original images from the CF card 50, executes a color sequential panorama mode composition processing, and area-sequentially writes the panorama image data of each color into the print buffer memory 56. The print buffer memory 56 has a memory capacity that is necessary and enough to print an image of a panorama size at a resolution of 300 dpi. For example, now assuming that the panorama paper size is equal to (100 mm×300 mm) and a density in each of the main scanning direction and the sub-scanning direction of the thermal head 11 is equal to 300 dpi, a memory capacity of the memory 56 is equal to 8 bits for each of RGB of (1181×3543) pixels, namely, (1181×3543×3)= 11.9 Mbytes.

First, the panorama image of yellow is composed and stored into the print buffer memory 56. The thermal controller 57 controls the applied voltage and the number of strobe pulses of the thermal head 11 in accordance with the image data of yellow which is stored into the print buffer memory 56. At the same time, the system controller 55 controls drive amounts of the conveying motor 54 of an ink sheet 12a and recording paper 15 by the motor controller 53 and controls conveyance amounts of the ink sheet 12a and recording paper 15. Thus, the image of yellow is recorded onto the recording paper 15.

Subsequently, to record a magenta image, the ink sheet 12a is wound so as to become a magenta portion. The recording paper 15 is returned to the original position as mentioned before and is set in a manner such that its front edge is located at a predetermined position by the paper sensor. The panorama composition processing of magenta is precedingly executed even during the resetting of the recording paper 15. The magenta image is recorded onto the recording paper 15 in a manner similar to yellow and, further, a cyan image is recorded onto the recording paper 15. In this manner, the recording of all colors is finished.

Figure 5:
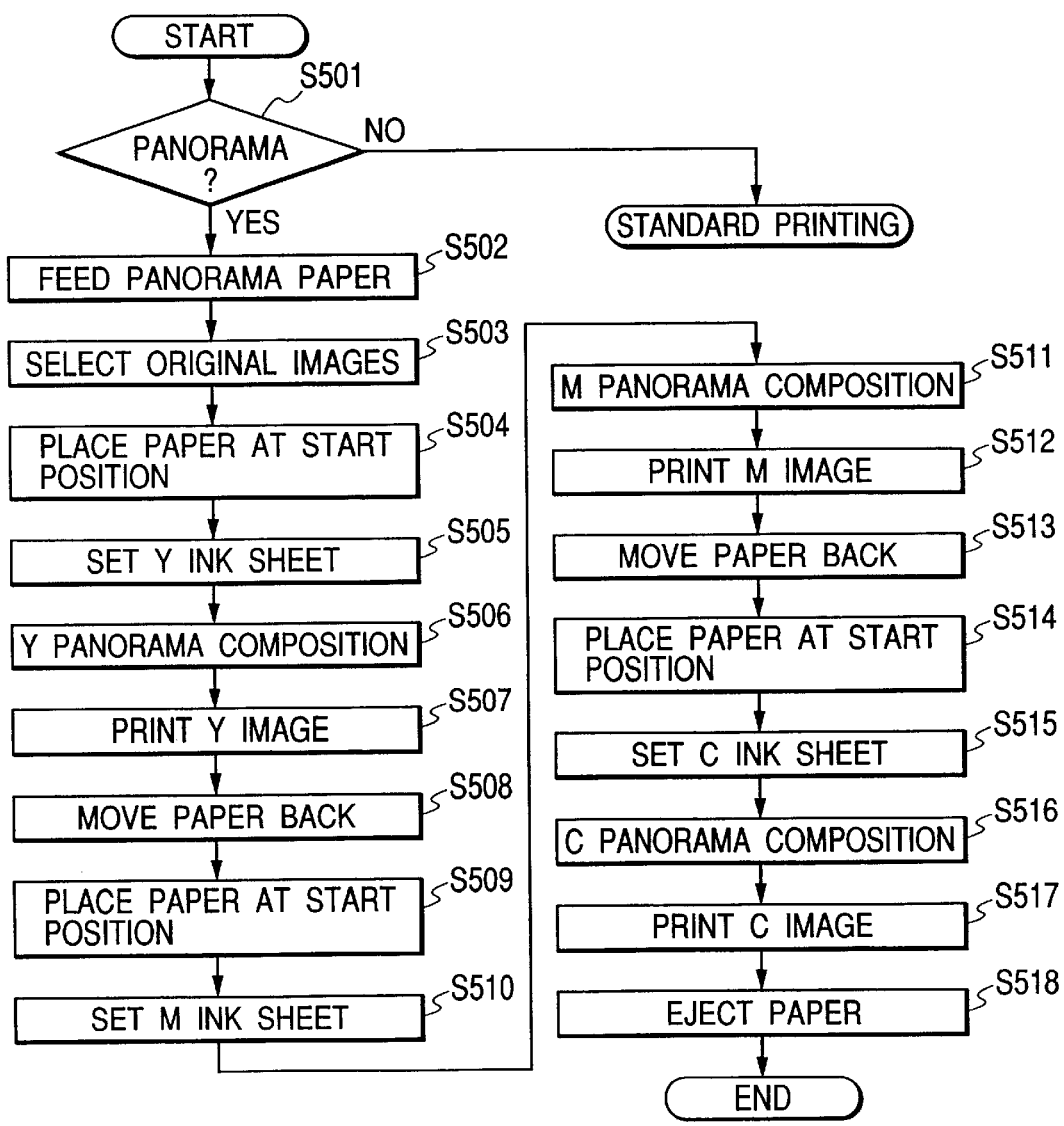
FIG. 5 is a flowchart for a whole processing of an embodiment.

FIG. 5 shows a flowchart in the panorama mode of the embodiment. When the print start switch 26 is pressed, the system controller 55 confirms the outputs of the ink sensor 14 and paper sensor 20 (step S501). When both of the outputs indicate the image for the panorama size, the panorama composition processing in step S502 and subsequent steps is executed. If either one of the outputs indicates the image for the standard size, the standard print processing is executed.

In the panorama composition processing, first, the recording paper 15 for panorama is conveyed (S502) and the original images are selected (S503). The recording paper 15 is conveyed to the initial position where the left edge of the panorama recording paper 15 is located at the position 15a (S504). At the same time, the ink sheet 12a is moved in the ink cassette 12 and the ink sheet 12a is set into yellow (S505). As already described above, the panorama composition processing of yellow is executed (S506) and the yellow composite image is recorded onto the recording paper (S507). For the recording of a next magenta image, the recording paper 15 is returned (S508) and its left edge is set to the position 15a (S509).

The ink sheet 12a is set into magenta (S510). The panorama composition processing of magenta is executed (S511). The magenta panorama composite image is printed onto the recording paper 15 (S512). For the recording of a next cyan image, the recording paper 15 is returned (S513) and its left edge is set to the position 15a (S514).

The ink sheet 12a is set into cyan (S515), the panorama composition processing of cyan is executed (S516), and the cyan panorama composite image is printed onto the recording paper 15 (S517).

Consequently, the panorama composite image of all colors is printed and the recording paper 15 is ejected from the apparatus (S518).

As already described, if the panorama composition processings (S506, S511, S516) are executed in parallel with the operations for setting the recording paper 15 and ink sheet 12a, it is preferable from a viewpoint of the time saving.

Figure 6:
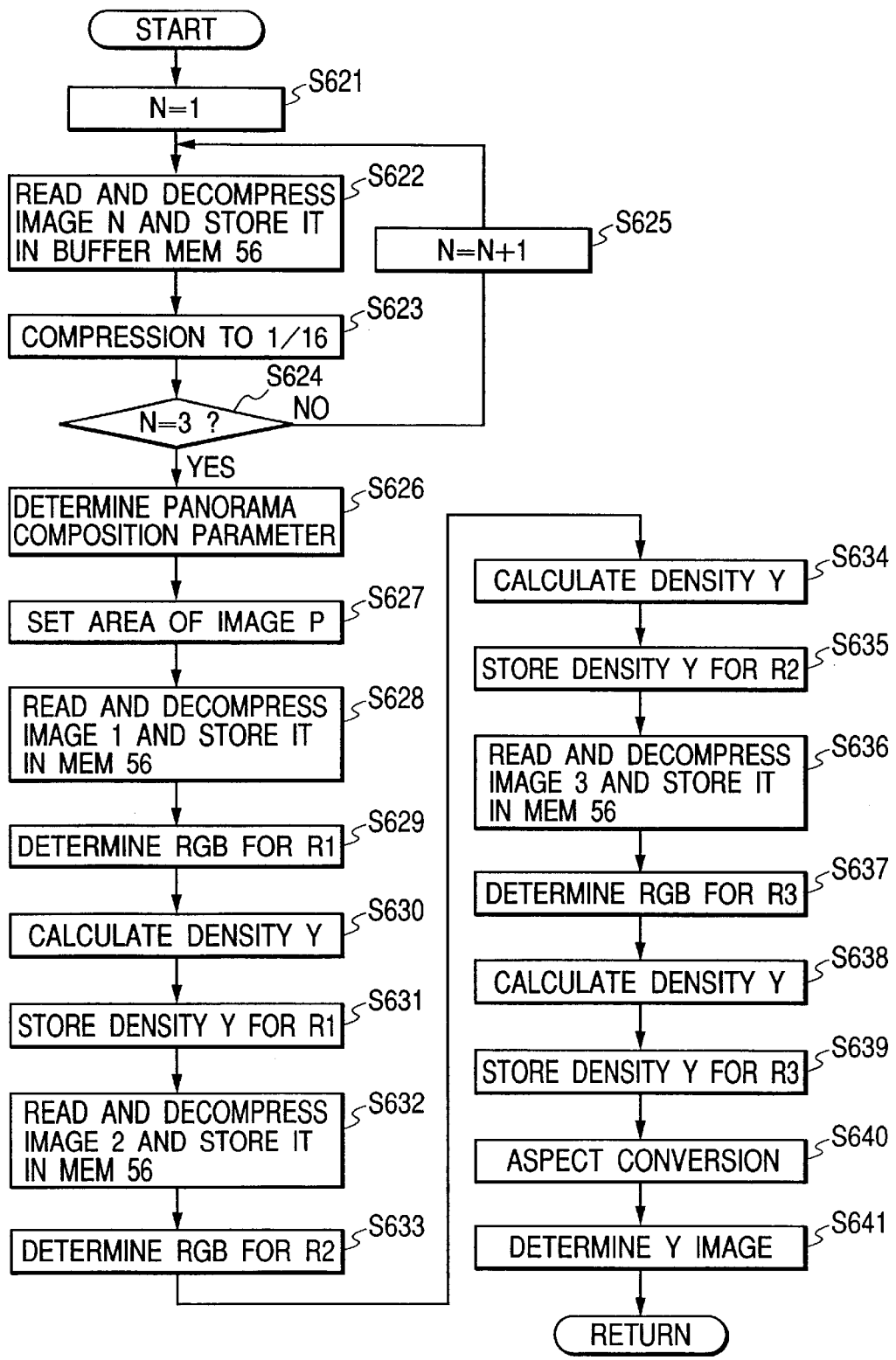
FIG. 6 is a detailed flowchart of step S506 in FIG. 5.

FIG. 6 shows a detailed flowchart of step S506 (yellow panorama composition processing) in FIG. 5. First, parameters necessary to panorama composition, namely, a position and a corresponding point of a joint portion, an affine transformation coefficient, parameters α, γ1, γ2, and γ3, and the like, which will be explained hereinlater, are determined (S621–S626).

For example, it is now assumed that three images are selected for panorama composition in step S503 and a size of one image is equal to (1536×1024×3=4.5 MBytes). "1" is set into an image number variable N (S621). An image N is read out from the CF card and is decompressed and is stored into the print buffer memory 56 (S622). Since a density that is almost equal to that of the original image is not always necessary in the parameter setting, for instance, the image is thinned out into ¼ in each of the vertical and lateral directions and the whole image is compressed into 1/16 (S623). A degree of thin-out is determined to be an optimum value in consideration of a balance between the precision and the memory capacity. The processings in steps S622 and s623 are executed with respect to the necessary original images (S624, S625). Since each of the original images is reduced into 1/16, even if three images are stored, a memory capacity is equal to (4.5×3/16=0.8 MBytes) and is sufficient.

Figure 7:
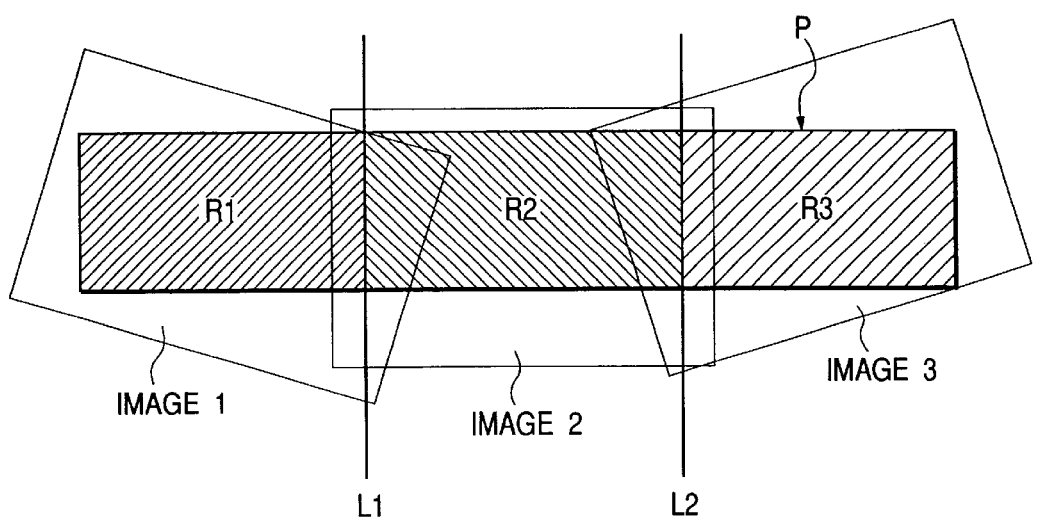
FIG. 7 is a schematic diagram in case of panorama composing three original images.

Subsequently, parameters necessary for panorama composition are determined from the three images stored in the memory 56 (S626). Although a luminance signal is desirable as a signal which is used for such a processing, a G signal can be also used. For example, although a well-known algorithm as disclosed in JP-A-9-93430 can be used for such a processing, it is particularly desirable to use an algorithm including a processing such that a joint portion of the composite image in the image composition becomes inconspicuous. For example, as shown in FIG. 7, it is now assumed that two joint portions L1 and L2 and a maximum inscribed image P are determined. In the image P, a portion to the left side from the joint portion L1 is labeled as an area R1, a portion to the right side from the joint portion L1 and to the left side from the joint portion L2 is labeled as an area R2, and a portion to the right side from the joint portion L2 is labeled as an area R3, respectively. The area R1 can be determined from the data of the image 1, the area R2 can be decided from the data of the image 2, and the area R3 can be decided from the data of the image 3, respectively. There are the relations of the following equations between coordinates (x, y) on an image P and coordinates (x', y') on each of the corresponding images 1, 2, and 3 by the affine transformation using coefficients a, b, c, and d decided in step S27. That $$x' = ax + by$$

$$y' = cx + dy$$

Data for printing is subsequently composed. In the subsequent steps, only the parameters decided in step S626 are necessary and the image data stored so far in the memory 56 is unnecessary.

A memory area of the image P is determined (S627). It is now assumed that a portrait side of each of the areas R1, R2, and R3 is α times as large as a portrait size of each of the images 1, 2, and 3 and landscape sizes of the areas R1, R2, and R3 are γ1 times, γ2 times, and γ3 times as large as the landscape sizes of the images 1, 2, and 3, respectively. Since it is sufficient to use a capacity for only one color as a memory capacity which is necessary to store the image P, it is equal to 1536×1024×α×(γ1+γ2+γ3). The values of α, γ1, γ2, and γ3 change in accordance with overlap states of the original images 1, 2, and 3. Usually, since (α<1) and (γ1+γ2+γ3<3), the memory capacity to store the image P does not exceed 4.5 MBytes.

Subsequently, the image 1 is again read out from the CF card and is JPEG decompressed and stored into the memory 56. Even in this case, the necessary memory capacity does not exceed 6 MBytes. The corresponding coordinates (x', y') on the image 1 are obtained by using the above-mentioned affine transformation in accordance with the order of the coordinates (x, y) of the image in the area R1, thereby obtaining the RGB values of the original images (S629). A density value Y of yellow is calculated from the obtained RGB values (S630) and a calculation result is sequentially written at a storing position corresponding to the coordinates (x, y) in the image P (S631).

In step S630, to save the processing time and the memory capacity, the density value Y of yellow can be also formed from only the B data with a complementary relation among RGB. To reconstruct a better color, for instance, it is also possible to execute what is called a mask processing or the like as disclosed in Japanese Patent No. 2640347 or No. 2689479 and to arithmetically operate from all of the data of RGB and to decide.

When the density of yellow is obtained with respect to all of the coordinates (x, y) in the area R1, data can be freely written into the memory areas other than the portion (corresponding to a capacity of 1536×1024×α×γ1) in which the result has been written.

Processings for the area R2 are subsequently similarly executed by using the image 2 (S632 to S634) and processings for the area R3 are subsequently similarly executed by using the image 3 (S636 to S639). In this processing step, the largest memory capacity is needed at the stage of S636 to S639 and it is equal to [3+α×(γ1+γ2+γ3)] times of 1536×1024. Therefore, at this time point, the necessary memory capacity does not exceed 9 MBytes and all of the processings can be finished by using the print buffer memory 56 of 11.9 MBytes.

In this manner, the yellow density is decided with regard to all of the pixels of the image P. However, the number of pixels of the image P at this stage is not always equal to the number of pixels of the print (in this example, 1181×3543). Therefore, an area of the aspect ratio of 1:3 is properly extracted from the image P (S640) and an interpolation processing is executed, thereby finally obtaining data of 1181×3543 (S641). If the image P is laterally longer than the aspect ratio 1:3, the landscape width is slightly cut out. In the opposite case, the upper and lower portions are cut out. It is also possible to print with upper and lower or right and left margins remained without trimming.

In this way, the panorama composition processing of yellow can be executed by the limited memory capacity. The panorama composition of magenta and cyan can be also realized by similar processings with a similar memory capacity. If the panorama composition conditions are the same for all of the colors, a color deviation does not occur and an arithmetic operation amount can be also reduced. Therefore, for magenta and cyan, it is preferable to use the panorama composition conditions calculated for yellow as they are.

Although the above explanation has been made on the assumption that up to three images are composed, by properly increasing the capacity of the memory 56, three or more images can be also composed. According to the invention, the panorama image can be printed with a small memory capacity although it takes a slightly long processing time. The same shall also similarly apply in the case where the number of pixels of the original image is larger.

Although the sublimation-type thermal printer has been described as an example of a printer, the invention can be also applied to a printer of another type such as thermal-transfer-type, electrophotographic-type, or the like, for example, the printer of the ink-jet-type so long as it is of the color area-sequential type.

Although the embodiment has been described on the assumption that the recording medium is the CF card, a PCMCIA card or the like can be also used or two kinds of slots can be also prepared so as to enable both of the CF card and the PCMCIA card to be read.

Although the embodiment has been described on the assumption that three colors of yellow, cyan, and magenta are used, black can be also added. Although there is an example of using the larger number of inks in order to obtain a photograph quality, it will be obviously understood that the embodiment can be also applied to such a printer.

The embodiment can be applied to a system comprising a plurality of equipment (for example, a host computer, interface equipment, a reader, a printer, and the like) or can be also applied to an apparatus comprising one equipment (for instance, a copying apparatus or a facsimile apparatus).

The present invention also incorporates a case where in order to make various devices operate so as to realize the functions of the foregoing embodiment, program codes of software to realize the functions of the embodiment are supplied to a computer of an apparatus or a system connected to those various devices. The computer (CPU or MPU) of such an apparatus or system reads out the program codes and makes the various devices operate in accordance with the stored program.

In this case, the program codes themselves of the software realize the functions of the embodiment mentioned above and the program codes themselves and means for supplying the program codes to the computer, for example, a storage medium in which the program codes have been stored, form the invention. As a storage medium to store the program codes, for example, it is possible to use any one of a floppy disk, a hard disk, an optical disk, a magnetooptic disk, a CD-ROM, a magnetic tape, a non-volatile memory card, a ROM, and the like.

It will be obviously understood that not only in the case where the functions of the embodiment are realized by executing the supplied program codes by the computer but also in the case where the program codes realize the functions of the embodiment in cooperation with the OS (Operating System), another application software, or the like which is operating in the computer, the program codes are incorporated in the embodiment of the present invention.

Further, it will be obviously understood that the invention also incorporates a case where the supplied program codes are stored into a memory equipped for a function expanding board of a computer or a function expanding unit connected to the computer and, after that, a CPU or the like provided for the function expanding board or function expanding unit executes a part or all of the actual processings on the basis of instructions of the program codes, and the functions of the embodiment are realized by those processings.

As will be easily understood from the above description, according to the embodiment, by area-sequentially performing the panorama composition processing, the panorama composite image can be outputted even with a small memory capacity.

An example of zooming a panorama image in accordance with a memory capacity and printing will now be described.

FIG. 8 shows a flowchart for the composition processing in the embodiment. First, a plurality of images to be composed are selected by the panorama marker (S81). After they were selected, when the user enters an instruction to start the printing (S82), the system controller 55 confirms a size (or data amount) of the selected image (S83). For example, in case of a JPEG file, a bit map file, or the like, since information of the image size has been stored in the header of the file, it is sufficient to read it.

Subsequently, a work memory size V that is necessary for composition is calculated on the basis of the image size (S84). The necessary work memory size V is compared with a work memory size U of the buffer memory 56 for CMY which is currently available (S85). When V is larger than U (S85), since the composition is impossible, the original image is compressed to the size at which the composition is possible (S86) and the composition processing is executed (S87). When V is equal to or less than U (S85), the composition processing is immediately executed (S87). A well-known method is used for the composition processing (S87) itself. A composition result is supplied to a thermal head 58 and is printed and outputted (S88).

A method of calculating the work memory size V necessary for composition will now be described in more detail. For example, it is assumed that two images of image sizes A1 and A2 are composed. The simplest case will be considered here. A memory size which is necessary when the data of two images is stored in the work memory 56 is equal to A1+A2. Although the image size after the composition varies depending on a composing method, it is roughly equal to A1+A2. Now, assuming that a size of area which is necessary to assure various parameters which are needed for composition is labeled as T, a total memory size necessary for composition can be calculated as 2×(A1+A2)+T. This total memory size is compared with the currently available memory size U (S85).

The above method is the simplest calculating method and the memory size V necessary for composition can be further reduced by devising a composition algorithm. For example, when the printer is a thermal sublimation-type printer, the printing operation is area-sequentially executed. Therefore, if the composition is performed for every color, the printing operation is performed each time, and upon composition of a next color, data is overwritten into the data area which has already been printed and is now unnecessary, the image size after completion of the composition is reduced into ⅓. When the composite image is formed, if the original images are read out every line, the necessary memory size can be further reduced.

As a composition processing in step S87, it is preferable to devise an algorithm so as to reduce the memory size necessary for composition as much as possible. In the calculation in step S84, the memory size is calculated in correspondence to the algorithm.

Even if a devised plan to reduce the memory size necessary for composition as much as possible is made as mentioned above, when the image size is very large or a number of images are composed, there is a case where the memory size necessary for composition exceeds the currently available memory size. In such a case, according to the embodiment, the image size is compressed (S86). A degree of compression of the image size will now be briefly explained. In the above description, the memory size V necessary for composition is equal to 2×(A1+A2)+T. Now, assuming that the currently available memory size is equal to U, the maximum value of $\alpha$ which satisfies the following relation [$U \geq 2\times(A1\times\alpha+A2\times\alpha)+T$] and in which A1×$\alpha$ and A2×$\alpha$ are equal to integer values is obtained. By compressing the image by using this $\alpha$, the composition processing can be performed by using the obtained compressed image.

In place of such a compression, it is also possible to perform a processing for encoding the image data and reducing its data amount. In brief, it is sufficient to execute another processing without limiting to the compression.

By constructing as mentioned above, even in case of composing a large image or in case of composing a number of images, the composition processing can be performed within the currently available memory size. However, if the compression degree is too large in the compression processing, when the composite image is printed, it remarkably differs from the original image. To avoid such a situation, it is sufficient to limit the degree of the compression processing and not to perform the composition processing and print processing when it is necessary to further compress.

Although the composition processing has merely been described in the above explanation, besides what is called a panorama composition processing, the invention can be also effectively applied to the other composition processings such as pixel shift processing as disclosed in JP-A-5-7366 and JP-A-9-307802 and dynamic range zoom processing as disclosed in JP-A-8-37628 and JP-A-8-149487. That is, the invention can be applied to various image processings.

As image memory size generating means, the memory size has been calculated as 2×(A1+A2)+T as shown in the foregoing embodiment. However, it is also possible to previously store the data size necessary for composition into a table and to extract the data necessary for composition from the table without performing such a calculation.

The embodiment can be applied to a system comprising a plurality of equipment or can be also applied to an apparatus comprising one equipment.

The scope of the invention also covers a case where program codes of software to realize the functions of the embodiment are supplied to a computer of an apparatus or system connected to various devices so as to make the various devices operative in order to realize the functions of the embodiment and the computer (CPU or MPU) of the apparatus or system reads out the program codes and makes the various devices operative in accordance with a stored program.

In this case, the program codes themselves of the software realize the functions of the embodiment mentioned above and the program codes themselves and means for supplying the program codes to the computer, for example, a storage medium in which the program codes have been stored, form the invention. As a storage medium to store the program codes, for example, it is possible to use anyone of a floppy disk, a hard disk, an optical disk, a magnetooptic disk, a CD-ROM, a magnetic tape, a non-volatile memory card, a ROM, and the like.

It will be obviously understood that not only in the case where the functions of the embodiment are realized by executing the supplied program codes by the computer but also in the case where the program codes realize the functions of the embodiment in cooperation with the OS (Operating System), another application software, or the like which is operating in the computer, the program codes are incorporated in the embodiment of the present invention.

Further, it will be obviously understood that the invention also incorporates a case where the supplied program codes are stored into a memory equipped for a function expanding board of a computer or a function expanding unit connected to the computer and, after that, a CPU or the like provided for the function expanding board or function expanding unit executes a part or all of the actual processings on the basis of instructions of the program codes, and the functions of the embodiment are realized by those processings.

As will be easily understood from the above description, according to the embodiment, various composition processings such as a panorama composition processing and the like and its output can be performed even by a limited memory.

A processing procedure for allowing an image designated by a panorama marker to be preferentially displayed on a video monitor will now be described with reference to FIG. 9. A program regarding the flowchart of FIG. 9 has been stored in the ROM of the system controller 55. The RAM of the system controller 55 is used as a work memory and is controlled by the CPU of the system controller 55. Only a procedure to the processings until the thumbnail file is displayed on the monitor is shown in FIG. 9.

First, a check is made to see if a memory card has been attached into the image printing apparatus (S91). When the memory card is attached, a root directory of the memory card is automatically retrieved, thereby searching marker files (S92). Now, assuming that the contents of the memory card have a structure as shown in FIG. 4, in step S92, since a panorama marker file and a print marker file are found, the processing routine advances to step S93. In S93, the contents of the above two files are read out and corresponding file names are stored into the work memory. In case of a panorama composition instruction marker file, the file names can be also stored into the work memory by rearranging to the composition order of the images.

In step S94, the order to display the thumbnail images onto the monitor is determined in the following manner. First, the file names have already been stored in the work memory in accordance with the order of the image data added with the panorama composition instruction mark and print instruction mark. The image data other than the above image data is sequentially added into the work memory in accordance with the order of the file names or the order of the stored images. After the file names of all of the image data were stored into the work memory as mentioned above, in step S95, the thumbnail files are sequentially displayed on the monitor 60 in accordance with the order of the file names on the work memory.

When no marker file is found in step S92, the images are sequentially displayed on the monitor in accordance with the order of the file names or the order of the stored thumbnail images.

FIGS. 10A and 10B show display examples on the monitor in the case where the marker files are preferentially displayed and the case where they are not preferentially displayed. FIG. 10A shows the case where the images with the mark are preferentially displayed. FIG. 10B shows the case where they are not preferentially displayed. The image added with ● is the image with the print instruction mark. The image with a character display such as Pl-1 or the like is the image with the panorama composition instruction mark. Each image itself is omitted here. It will be obviously understood that as shown in the diagrams, by preferentially displaying the images with the marks, the mark of the image data can be easily confirmed.

With respect to the image data in the memory card as well, by rearranging the files on the work memory in accordance with the file order and storing them, the files with the marks can be also preferentially displayed without executing the above procedure from the next time. When a plurality of marks exist, only a specific mark can be preferentially displayed or it is also possible to enable the order of the marks which are preferentially displayed to be also determined.

In the embodiment of the invention, the memory card in which the image data photographed by the digital camera has been recorded is used as image input means. However, image information may be inputted from the digital camera to the image printing apparatus by wire or wireless means, or image information added with various marks may be recorded into the memory card by using a personal computer or the image information may be also inputted to the image printing apparatus by a wire or wireless means.

Further, although the external monitor has been used as display means in the embodiment of the invention, a display apparatus can be assembled in the image printing apparatus. In such a case, it is considered that the display screen is further smaller than that in the embodiment of the invention and the invention is particularly effective.

An example to which a function is further added will now be described. A function to change the priorities of the images to be displayed to an external display apparatus in accordance with an output mode in the case where the image printing apparatus has a plurality of output modes is added. Only changed and added portions will now be described.

For simplicity of explanation, it is assumed that there are two modes of the standard mode and the panorama mode as a plurality of outputs modes which the image printing apparatus has. The standard mode shows an output to a sheet of an ordinary postal card size. The panorama mode shows an output to a sheet having a length that is twice as long as the postal card size in the portrait direction.

Figure 11:
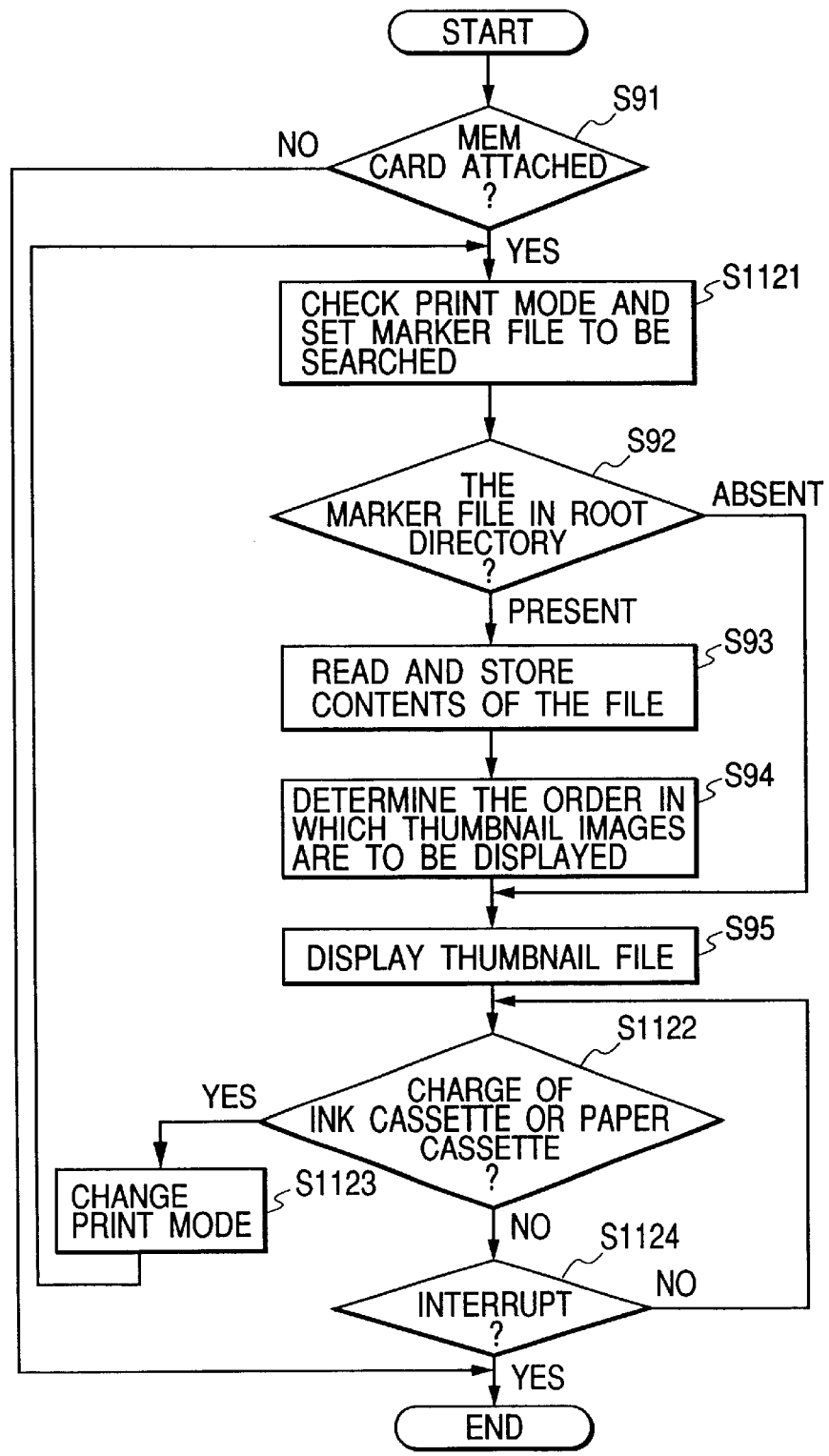
FIG. 11 is a flowchart showing a processing procedure according to another embodiment.

As an image printing apparatus, it is desirable to use an apparatus which discriminates the kind of ink cassette, paper cassette, or sheet cassette and can automatically select the output mode in accordance with the discriminated kind. In the embodiment of the invention, a control flow to accomplish the object of the invention in case of using such an image printing apparatus will now be described with reference to FIG. 11. Processing steps S1121, S1122, S1123, and S1124 are added to the flow of FIG. 9. In step S1122, a check is made to see if the ink cassette or paper cassette has been changed. When it is decided that such a cassette has been changed, the printing mode is switched in step S1123 and the processing routine advances to step S1121. In step S1121, the printing mode at that time is checked and, for example, in case of the panorama mode, the mark to be searched is set to be only the panorama composition instruction marker file. Subsequently, only the panorama composition instruction marker file is searched in step S92 and the processings in steps S93 to S95 are executed, so that display contents as shown in FIG. 12 are derived. By setting such that the marker files to be searched in the standard mode do not exist, when it is determined to be the standard mode, an image is displayed as shown in FIG. 10B. When it is determined in step S1122 that the cassette is not changed, step S1124 follows and a check is made to see if there is an interruption of another processing. If there is no interruption, the processing routine is returned to step S1122. If there is the interruption, the processing routine is finished. By the above processings, if the ink cassette or sheet cassette has already been replaced during the display of the image onto the monitor, the display picture plane can be automatically changed.

In place of the processings in S1122 and S1123, the user can manually switch the mode and switch the display in accordance with the mode switching and change the display picture plane to the display picture plane according to the printing mode.

It is also possible to provide the mode for automatically printing all of the images with the print instruction mark in a lump. In this case, the search marker file is set to only the print instruction mark in step S1121 and the images with the print instruction mark can be also preferentially displayed.

Since the priorities of the images which are displayed are determined in accordance with the printing mode of the image printing apparatus as mentioned above, the operation and images can be fairly easily confirmed.

According to the embodiment as described above, even if there are many images and they cannot be displayed in a lump by the display means, the images which are specified by the marks are preferentially displayed, so that the images specified by the marks can be easily recognized. Since the images specified by the same mark are collectively displayed, the images specified by the various marks can be easily confirmed and the work to print out is also simplified.

What is claimed is:

1. A printer comprising:
   a connection unit, adapted for detachably connecting a memory to said printer, the memory storing a first plurality of image data and attribution information specifying a second plurality of image data from among the first plurality of image data, the second plurality of image data forming a panorama group;
   a read unit, adapted for reading the second plurality of image data from the memory based on the attribution information specifying the second plurality of image data stored in the memory;
   a composition unit, adapted for composing a panoramic image from the second plurality of image data read by said read unit according to the attribution information; and
   a print unit, adapted for printing the panoramic image composed by said composition unit.

2. A printer according to claim 1, wherein said print unit is an ink jet printer and executes panoramic printing in the case where a panoramic printing mode has been set by a switch.

3. A printer according to claim 1, wherein in response to an automatic printing instruction, said read unit, said composition unit and said print unit perform respective processing.

4. A printer according to claim 1, wherein:
   the memory stores information specifying a third set of image data from among the first plurality of image data;
   said read unit reads the second plurality of image data from the memory on the basis of the attribution information specifying the second plurality of image data in the case where a first mode has been designated and reads the third plurality of image data on the basis of the information specifying the third plurality of image data in the case where a second mode has been designated; and
   said print unit prints the image data read by said read unit.

5. A printer according to claim 1, wherein said composition unit composes the panoramic image for every color component, and
   said print unit area-sequentially prints the image data.

6. A printer according to claim 1, wherein said composition unit compares a memory size which can be used for composing the panoramic image with a memory size which is necessary for composing the panoramic image and executes a zoom processing of the image data in accordance with a comparison result.

7. A printer according to claim 1, wherein said composition unit executes compression processing of the image data when a memory size which can be used for composing the panoramic image is smaller than a memory size which is necessary for composing the panoramic image.

8. A printer according to claim 1, further comprising means for selecting the image data on the basis of the attribution information specifying the second plurality of image data stored in the memory and allowing the image corresponding to the selected image data to be preferentially displayed by display means prior to other images.

9. A printer comprising:
  a connection unit, adapted for detachably connecting a memory to said printer, the memory storing a first plurality of image data, information specifying a second plurality of image data from among the first plurality of image data, the second plurality of image data forming a panorama group, and a print marker specifying at least one of the first plurality of image data designated by a user for printing;
  a discrimination unit, adapted for discriminating whether a cassette for panoramic printing has been set; and
  a print unit, adapted for (i) if said discrimination unit discriminates that the cassette has been set, reading the second plurality of image data from the memory based on the information specifying the second plurality of image data stored in the memory, composing a panoramic image from the second plurality of image data, and printing the panoramic image and (ii) if said discrimination unit discriminates that the cassette has not been set, for reading the at least one image data from the memory based on the print marker stored in the memory and printing the at least one image data.

10. A control method of a printer to which a memory is detachably connectable, the memory storing a first plurality of image data and attribution information specifying a second plurality of image data from among the first plurality of image data, the second plurality of image data forming a panorama group, said method comprising:
  a reading step of reading the second plurality of image data from the memory based on the attribution information specifying the second plurality of image data stored in the memory;
  a composing step of composing a panoramic image from the second plurality of image data read in said reading step according to the attribution information; and
  a printing step of printing the panoramic image composed in said composing step.

11. A method according to claim 10, wherein said printing step is executed by an ink jet printer and panoramic printing is executed in the case where a panoramic printing mode has been set by a switch.

12. A method according to claim 10, wherein said reading, composing and printing steps are performed in response to an automatic printing instruction.

13. A method according to claim 10, wherein:
  the memory stores information specifying a third plurality of image data from among the first plurality of image data;
  in said reading step, the second plurality of image data is read on the basis of the attribution information specifying the second plurality of image data in the case where a first mode has been designated and the third plurality of image data is selected on the basis of the information specifying the third plurality of image data in the case where a second mode has been designated; and
  in said printing step, the image data read in said reading step is printed.

14. A method according to claim 10, wherein in said composing step, the composing of the panoramic image is executed for every color component, and
  in said printing step, the image data which was composed is area-sequentially printed.

15. A method according to claim 10, wherein in said composing step, a memory size which can be used for composing the panoramic image is compared with a memory size which is necessary for composing the panoramic image and a zoom processing of the image data is executed in accordance with a comparison result.

16. A method according to claim 10, wherein in said composing step, a compression processing of the image data is executed when a memory size which can be used for composing the panoramic image is smaller than a memory size which is necessary for composing the panoramic image.

17. A method according to claim 10, further comprising steps of selecting the second plurality of image data on the basis of the attribution information specifying the second plurality of image data stored in the memory and allowing the image corresponding to the selected image data to be preferentially displayed by a display step prior to other images.

18. A method of controlling a printer to which a memory is detachably connectable, the memory storing a first plurality of image data, information specifying a second plurality of image data from among the first plurality of image data, the second plurality of image data forming a panorama group, and a print marker specifying at least one of the first plurality of image data designated by a user for printing, said method comprising:
  a discriminating step of discriminating whether a cassette for the panoramic printing has been set; and
  a printing step of (i) if it is discriminated in said discriminating step that the cassette has been set, reading the second plurality of image data from the memory based on the information specifying the second plurality of image data stored in the memory, composing a panoramic image from the second plurality of image data, and printing the panoramic image and (ii) if it is discriminated in said discriminating step that the cassette has not been set, reading the at least one image data from the memory based on the print marker stored in the memory and printing the at least one image data.

19. A control program of a printer to which a memory is detachably connectable, the memory storing a first plurality of image data and attribution information specifying a second plurality of image data from among the first plurality of image data, the second plurality of image data forming a panorama group, wherein said program comprises:
  a reading step of reading the second plurality of image data from the memory based on the attribution information specifying the second plurality of image data stored in the memory;
  a composing step of composing a panoramic image from the second plurality of image data read in said reading step according to the attribution information; and
  a printing step of printing the panoramic image composed in said composing step.

20. A program according to claim 19, wherein said printing step is executed by an ink jet printer and panoramic printing is executed in the case where a panoramic printing mode has been set by a switch.

21. A program according to claim 19, wherein said reading, composing and printing steps are performed in response to an automatic printing instruction.

22. A program according to claim 19, wherein:
  the memory stores information specifying a third plurality of image data from among the first plurality of image data;
  in said reading step, the second plurality of image data is read on the basis of the attribution information specifying the second plurality of image data in the case where a first mode has been designated and the third plurality of image data is selected on the basis of the information specifying the third plurality of image data in the case where a second mode has been designated; and in said printing step, the image data read in said reading step is printed.

23. A program according to claim 19, wherein in said composing step, the composing of the panoramic image is executed for every color component, and in said printing step, the image data which was composed is area-sequentially printed.

24. A program according to claim 19, wherein in said composing step, a memory size which can be used for composing the panoramic image is compared with a memory size which is necessary for composing the panoramic image and a zoom processing of the image data is executed in accordance with a comparison result.

25. A program according to claim 19, wherein in said composing step, a compression processing of the image data is executed when a memory size which can be used for composing the panoramic image is smaller than a memory size which is necessary for composing the panoramic image.

26. A program according to claim 19, wherein said program further comprises steps of selecting the second plurality of image data on the basis of the attribution information specifying the second plurality of image data stored in the memory and allowing the image corresponding to the selected image data to be preferentially displayed by a display step prior to the other images.

27. A program of controlling a printer to which a memory is detachably connectable, the memory storing a first plurality of image data, information specifying a second plurality of image data from among the first plurality of image data, the second plurality of image data forming a panorama group, and a print marker specifying at least one of the first plurality of image data designated by a user for printing, said method comprising:

a discriminating step of discriminating whether a cassette for the panoramic printing has been set; and a printing step of (i) if it is discriminated in said discriminating step that the cassette has been set, reading the second plurality of image data from the memory based on the information specifying the second plurality of image data stored in the memory, composing a panoramic image from the second plurality of image data, and printing the panoramic image and (ii) if it is discriminated in said discriminating step that the cassette has not been set, reading the at least one image data from the memory based on the print marker stored in the memory and printing the at least one image data.

* * * * *

UNITED STATES PATENT AND TRADEMARK OFFICE
CERTIFICATE OF CORRECTION

PATENT NO. : 6,867,879 B1
DATED : March 15, 2005
INVENTOR(S) : Takashi Sasaki et al.

It is certified that error appears in the above-identified patent and that said Letters Patent is hereby corrected as shown below:

Column 9,
Line 49, "That" should read -- That is --; and
Line 60, "R3 is a" should read -- R3 is $\alpha$ --.

Column 12,
Line 63, "of a which" should read -- of $\alpha$ which --.

Column 13,
Line 47, "anyone" should read -- any one --.

Signed and Sealed this

Twenty-seventh Day of December, 2005

JON W. DUDAS
*Director of the United States Patent and Trademark Office*